United States Patent
Pompei

[19]

[11] Patent Number: 5,803,604
[45] Date of Patent: Sep. 8, 1998

[54] THERMOCOUPLE TRANSMITTER

[75] Inventor: Francesco Pompei, Boston, Mass.

[73] Assignee: Exergen Corporation, Watertown, Mass.

[21] Appl. No.: 720,448

[22] Filed: Sep. 30, 1996

[51] Int. Cl.$^6$ .................... G01J 5/16; G01J 5/02; G01K 7/12
[52] U.S. Cl. ............... 374/181; 374/121; 250/338.1
[58] Field of Search .................... 374/181, 121, 374/130; 250/338.1

[56] References Cited

U.S. PATENT DOCUMENTS

| 2,836,639 | 5/1958 | Templin | 374/181 |
|---|---|---|---|
| 3,562,729 | 2/1971 | Hurd, III | 374/181 |
| 4,120,201 | 10/1978 | Wargo | 374/181 |
| 4,588,308 | 5/1986 | Saito | 374/181 |
| 4,623,266 | 11/1986 | Kielb | 374/181 |
| 4,936,690 | 6/1990 | Goetzinger | 374/181 |
| 5,088,835 | 2/1992 | Shigezawa et al. | 374/181 |
| 5,163,755 | 11/1992 | Shimomura et al. | 374/181 |
| 5,229,612 | 7/1993 | Pompei et al. | 250/349 |
| 5,328,264 | 7/1994 | Krencker et al. | 374/181 |
| 5,528,041 | 6/1996 | Pompei | 250/349 |

FOREIGN PATENT DOCUMENTS

| 0993132 | 10/1951 | France | 374/181 |
|---|---|---|---|
| 0041570 | 3/1977 | Japan | 374/181 |
| 2082774 | 3/1982 | United Kingdom | 374/181 |

OTHER PUBLICATIONS

IRt/c Prior Art, one sheet sketch. (no date).
Pamphlet, "Two Wire 4–20 MA Transmitter,", Exergen Corporation, one sheet, 1995.

Primary Examiner—Diego F. F. Gutierrez
Attorney, Agent, or Firm—Hamilton, Brook, Smith & Reynolds, P.C.

[57] ABSTRACT

A loop transmitter is connected between a thermocouple and a loop detector circuit. The transmitter has a circuit mounted on an elongated circuit board within a cylindrical housing with thermocouple leads and output leads extending from opposite ends of the cylinder. The circuit is potted in high conductivity epoxy, with an adjustment screw left exposed. After amplifier offset adjustment, the housing is completely filled with a lower conductivity epoxy.

10 Claims, 2 Drawing Sheets

THERMOCOUPLE TRANSMITTER

BACKGROUND

Thermocouple temperature detection systems have conventionally included a thermocouple hot junction, at a distal end of a pair of thermocouple leads, in contact with an object of which the temperature is to be detected. The proximal ends of the thermocouple leads are connected to a thermocouple meter which includes a thermocouple cold junction and circuitry for sensing the voltage generated by the thermocouple. (The terms hot and cold junction conventionally refer to the measurement and reference junctions respectively even though the measurement junction may be at a colder temperature.) The cold junction would typically be suspended in a thermowell which would be maintained at a stable reference temperature. The cold junction would be suspended from a flat cylindrical head unit, like a hockey puck, which would be mounted to close the opening of the well. The head unit would have lead connecting screws on its top end, at least two for connecting the thermocouple leads to the hot junction and two for connecting to a sensing loop in the meter. An amplifier within the head unit would amplify the output voltage of the thermocouple.

More recently, the suspended cold junction has been replaced by a cold junction mounted to a circuit board along with a semiconductor temperature sensing and amplifying circuit. To provide retrofit packaging compatibility with existing thermocouple meters, the circuits have been packaged in flat cylindrical units which mount at the openings of the now unnecessary temperature wells.

Because the semiconductor circuits no longer require the stable temperature well, the flat cylindrical units have also been positioned near to remote thermocouple junctions, thus minimizing the lengths of the thermocouple leads. They then serve as loop transmitters connected to meters through extended copper leads. In such remote locations, loop transmitters would require an additional housing for protection. They would also require calibration to specific temperature ranges, usually with thermocouple simulators or other such devices, thus requiring significant set-up time and a possibility of unauthorized recalibration.

Recently, conventional contact thermocouple junctions are being replaced by infrared thermocouples such as disclosed in U.S. Pat. No. 5,229,612 and U.S. Pat. No. 5,528,041. The infrared thermocouple uses a noncontact thermopile to sense the thermal radiation from a target. The hot junction of a thermocouple is connected in series with the thermopile, and the circuit is designed to mimic the output of a conventional thermocouple. Conventional loop transmitters may be used with infrared thermocouples just as they have been used with conventional thermocouples.

SUMMARY OF THE INVENTION

The present invention is directed to a replacement for conventional loop transmitters. In accordance with the invention, a transmitter comprises an elongated cylindrical metal housing and a circuit within the housing. The transmitter circuit includes a sensor for sensing a thermocouple cold junction temperature and an amplifier for amplifying a thermocouple voltage, the voltage being dependent on the sensed thermocouple junction temperature and a remote thermocouple hot junction temperature. Thermocouple leads and output leads extend from the transmitter circuit through opposite ends of the housing.

Preferably, the transmitter circuit is on a circuit board which extends axially within the cylindrical housing and which is potted in a high conductivity potting material. The high conductivity potting material substantially eliminates temperature gradients that cause errors. An electrical shield which surrounds the thermocouple leads is preferably electrically connected to the housing so that the housing serves as a shield to the transmitter circuit.

Preferably, the transmitter circuit includes a potentiometer with an adjustment screw for adjusting the amplifier offset. The screw extends toward the output end of the housing through which the output leads pass. During fabrication, the adjustment screw is left exposed from the high conductivity potting materia and the offset is adjusted while the housing is maintained at a stable calibration temperature. Thereafter, the remainder of the housing is filled with a lower conductivity potting material which surrounds the adjustment screw and the output leads within the housing.

With a preferred housing diameter of less than one inch and a length of less than ten inches, the transmitter can be readily connected in-line as a continuation of the cable and requires no mechanical support. It may be precalibrated for thermocouple type and temperature range to eliminate all field adjustments and the resultant need for simulators and the like. Even when used in wide temperature range applications, it is best to fix calibration of the transmitter and leave further scaling and calibration to the digital processor which receives the voltage output. With fixed precalibration, a hermetically sealed stainless steel housing is possible and suitable for the harshest service without any additional packaging.

The transmitter of the present invention is particularly suited to use in combination with a similarly packaged infrared thermocouple. Such a device, as disclosed in U.S. Pat. No. 5,229,612 includes a thermopile scaled by a potentiometer in a passive circuit and in series with a thermocouple to emulate a standard contact thermocouple.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
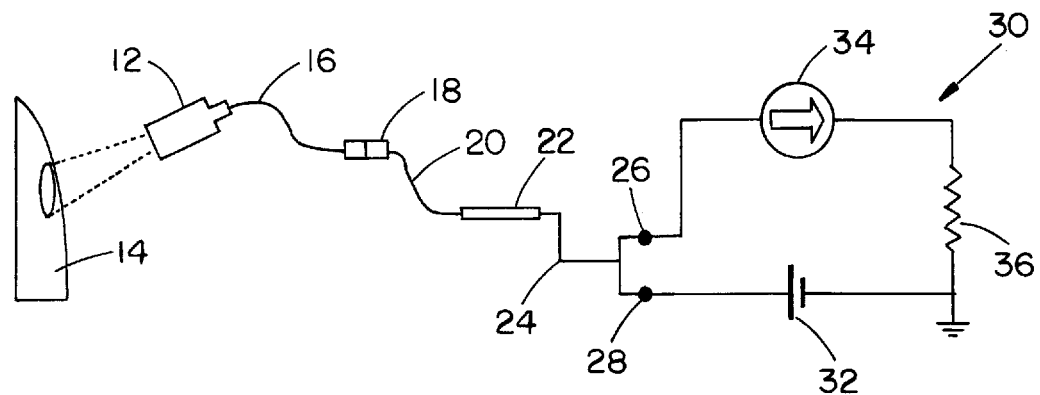
FIG. 1 illustrates an infrared thermocouple system including a transmitter embodying the present invention.

FIG. 1 illustrates an infrared thermocouple system embodying the present invention. It includes an infrared thermocouple 12, such as presented in U.S. Pat. No. 5,229,612, which views a target surface 14. The infrared thermocouple output on thermocouple leads 16 mimics the output which would be obtained with a thermocouple hot junction mounted directly to the target 14. The lead 16 is preferably 26 AWG stranded, twisted, shielded pair thermocouple wire about three feet in length. The wire 16 is coupled through a conventional thermocouple connector 18 to another thermocouple wire 20 which matches the wire 16 and is preferably about three feet in length. The wire 20 extends from one end of a transmitter 22 to be described in greater detail below.

From the opposite end of the transmitter 22 extends output wire 24 which includes copper conductors connected to screw connectors 26 an 28 of a loop detector 30. The wire 24 is preferably of 22 AWG stranded, twisted pair wire of about ten feet in length. Extensions of that wire may also be provided to longer lengths. The conventional loop detector includes a power supply 32 which powers the circuit within the transmitter 22 and a current meter 34 connected to a load circuit 36. In a typical application, the meter 34 would detect current within the range of 4–20 milliamps.

Although shown as a two-wire loop, a four-wire loop detector could also be used. In that case, the wire 24 would include separate power and sensing leads. The circuit in the transmitter 22 would be simpler in that the voltage to current inverter of a two-wire loop circuit would not be required.

Figure 2:
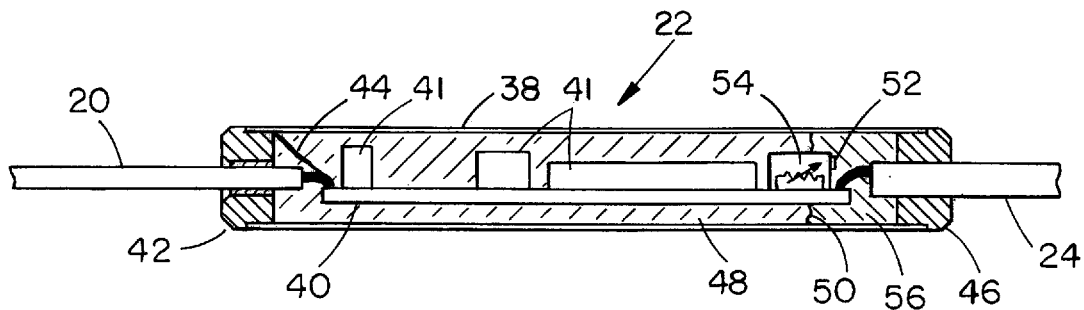
FIG. 2 is a longitudinal sectional view of the transmitter of FIG. 1.
Figure 3:
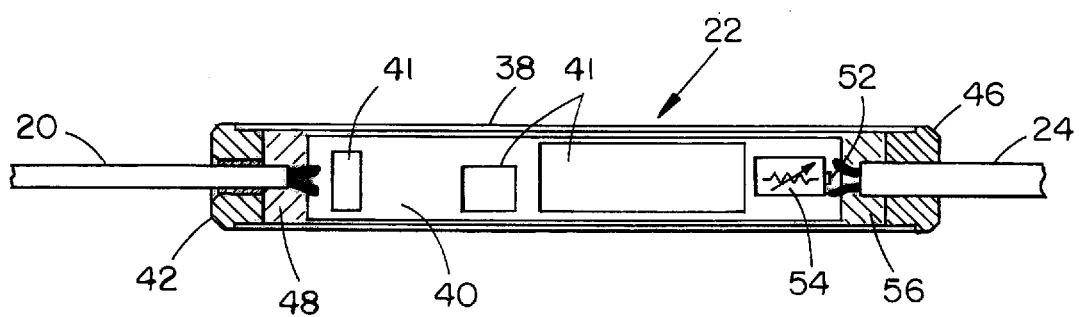
FIG. 3 is a longitudinal cross-sectional view of the transmitter rotated 90° relative to FIG. 2.

FIGS. 2 and 3 are longitudinal cross-sectional views of the transmitter 22. The transmitter includes a stainless steel cylindrical housing 38. The preferred housing is about three inches long and has a diameter of about 0.5 inches. With the small diameter, the housing provides a tough package which can lie on any surface as a small section of the cable including wires 20 and 24.

Positioned within the housing 38 is an elongated, axially extending printed circuit board 40. The printed circuit board has a width which is near to but less than the diameter of the cylinder 38 in order that the printed circuit board may be slid into the cylinder from one end and be supported by the cylinder near its center. The circuit board supports circuit elements 41 of the circuit of FIG. 4 to be described below.

The wire 20 extends through an end cap 42 and the two thermocouple leads from that wire are soldered to the board 40. The braided metallic layer 44 which serves as a shield about the thermocouple leads is electrically connected to the housing 38 so that the housing itself serves as a shield about the printed circuit board. At the opposite end of the circuit board, the two leads from the wire 24 are soldered to the board, and that wire extends through an end cap 46. Most of the printed circuit board and the circuit on that board are surrounded by a high conductivity potting material 48 such as thermal epoxy. Thermal epoxy has a high thermal conductivity, typically about one Btu/(hr-ft-°F.), which is about ten times the conductivity of normal epoxy. The thermal epoxy not only provides a durable structure, but also minimizes any temperature gradients in the circuits and any fluctuations in the gradients which existed where the circuit was calibrated. In particular, the circuit of FIG. 4 generates some heat and it is important that the heat be rapidly conducted away from the temperature sensor on the circuit board. The large aspect ratio of the transmitter also facilitates that thermal conduction to the environment.

During fabrication, the gain of the amplifier circuit on the board 40 is calibrated before the circuit is inserted into the cylinder. The cap 42 is press fit into the cylinder. The cylinder is then mounted vertically and filled with high conductivity epoxy to a level 50. At that level, the epoxy almost completely encloses the circuit but leaves an offset adjustment screw 52 to a potentiometer 54 exposed. The cylinder is then partially emersed in a water bath held at a stable 0° C. temperature. The adjustment screw 52 is used to set the offset of the amplifier to 4 milliamps at that calibration temperature. The cylinder is then completely filled with epoxy 56. It is preferred that the second epoxy be of nonthermal type. Such epoxy is less expensive, easier to use and cures more rapidly. The lower conductivity also provides a functional advantage by insulating the copper leads of wire 24 to minimize thermal gradients resulting from heat generated in that wire.

Figure 4:
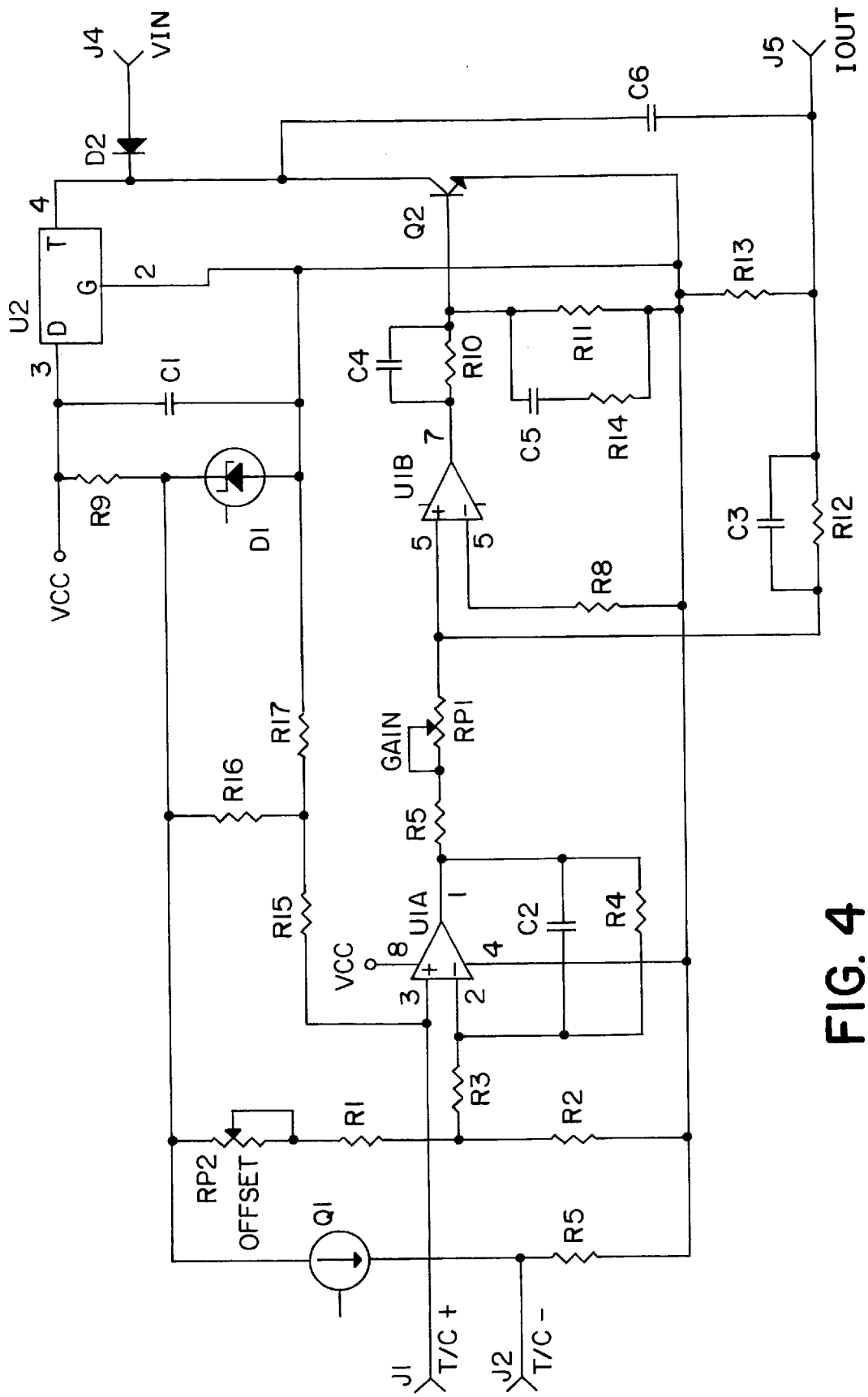
FIG. 4 is an electrical schematic diagram of the circuit of the transmitter of FIGS. 1, 2 and 3.

FIG. 4 is an electrical schematic of the circuit on the board 40. The circuit is kept simple to minimize its size and heat generation, leaving any sophisticated processing of the output signal to the meter to which the transmitter is connected. In particular, no attempt is made to linearize the output signal.

The cold junction temperature reference is provided by a temperature sensitive device Q1. That device is preferably an AD592B temperature sensitive current source manufactured by Analog Devices Inc. which generates a current of one $\mu A/°$ Kelvin. The current from device Q1 through resistor R5 establishes the cold temperature reference to which the voltage established across the cold junction J1, J2 is summed. The summed thermocouple voltage is applied to an amplifier U1A having a high gain. The amplifier receives at its inverting input a reference voltage established by offset potentiometer RP2 and resistors R1 and R2 in order to convert from degrees Kelvin to degrees Centigrade. Potentiometer RP2 is adjusted by the exposed adjustment screw 52. The output of the amplifier U1A is applied through a gain adjustment potentiometer RP1 to a transconductance amplifier of devices U1B through Q2. The potentiometer RP1 is adjusted prior to assembly.

Within the transconductance amplifier, the output of amplifier U1B is applied through a compensation RC circuit for stabilization. The output transistor Q2 establishes the current in a two wire current loop. In the two wire current loop, the transmitter circuit is powered by the voltage VIN across J4 and J5, and the sensed output is provided as a current in the loop through J4 and J5 as controlled by Q2. The circuit is designed to provide a current range of 4 milliamps to 20 milliamps over a temperature range from 0° C., the range being established by the circuit design and gain adjustments. A diode D2 prevents reverse current flow with an improper connection.

The voltage supply Vcc of the circuit is obtained through a voltage regulator U2 from the VIN voltage. A precision voltage reference circuit D1 regulates the voltage applied to the temperature sensor Q1 and provides a voltage reference to the offset potentiometer RP2.

Resistors R15, R16, and R17 provide a pull up to the input to amplifier U1A, causing the output of U1A to go high when there is an open circuit at J1,J2. The resultant output in the current loop of greater than 20 mA is seen as an error indication.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A thermocouple transmitter comprising:
   an elongated cylindrical metal housing having a diameter not greater than about one inch;
   a transmitter circuit in the housing including a sensor for sensing a thermocouple junction temperature and an amplifier for amplifying a thermocouple voltage, the voltage being dependent on the sensed thermocouple junction temperature and a remote thermocouple junction temperature, the transmitter circuit being potted in thermally conductive potting material within the housing;

thermocouple leads extending from the transmitter circuit through an input end of the housing; and output leads extending from the transmitter circuit through an output end of the housing, and wherein the thermocouple leads, the housing and the output leads effectively form a single cable.

2. A transmitter as claimed in claim 1 wherein an electrical shield layer surrounding the thermocouple leads is electrically connected to the housing.

3. A transmitter as claimed in claim 1 wherein an electrical shield layer surrounding the thermocouple leads is electrically connected to the housing.

4. A transmitter as claimed in claim 1 wherein the transmitter circuit is mounted on a circuit board extending axially within the housing.

5. A radiation detector and transmitter comprising:

an elongated cylindrical metal housing having a diameter not greater than about one inch;

a transmitter circuit in the housing including a sensor for sensing a thermocouple junction temperature and an amplifier for amplifying a thermocouple voltage, the voltage being dependent on the sensed thermocouple junction temperature and a remote thermocouple junction temperature, the transmitter circuit being potted in thermally conductive potting material within the housing;

thermocouple leads extending from the transmitter circuit through an input end of the housing;

output leads extending from the transmitter circuit through an output end of the housing; and a radiation detector which provides a scaled output to the thermocouple leads; and wherein the thermocouple leads, the housing and the output leads effectively form a single cable.

6. A radiation detector and transmitter as claimed in claim 5 wherein the radiation detector comprises a thermocouple in series with a thermopile.

7. A thermocouple transmitter comprising:

an elongated cylindrical metal housing;

a circuit board extending axially within the housing, the circuit board supporting a transmitter circuit including a sensor for sensing a thermocouple junction temperature, an amplifier for amplifying a thermocouple voltage which is dependent on the sensed thermocouple junction temperature and a remote thermocouple junction temperature, and an amplifier offset adjustment screw extending toward an output end of the housing;

thermocouple leads extending from the transmitter circuit through an input end of the housing, the thermocouple leads having a shield layer electrically coupled to the housing;

output leads extending from the transmitter circuit through an output end of the housing;

a high conductivity potting material potting the circuit board but not the offset adjustment screw within the housing; and a lower conductivity potting material potting the adjustment screw and output leads within the housing.

8. A transmitter as claimed in claim 7 wherein the diameter of the housing is less than one inch.

9. A radiation detector and transmitter comprising:

an elongated cylindrical metal housing;

a circuit board extending axially within the housing, the circuit board supporting a transmitter circuit including a sensor for sensing a thermocouple junction temperature, an amplifier for amplifying a thermocouple voltage which is dependent on the sensed thermocouple junction temperature and a remote thermocouple junction temperature, and an amplifier offset adjustment screw extending toward an output end of the housing;

thermocouple leads extending from the transmitter circuit through an input end of the housing, the thermocouple leads having a shield layer electrically coupled to the housing;

output leads extending from the transmitter circuit through an output end of the housing;

a high conductivity potting material potting the circuit board but not the offset adjustment screw within the housing;

a lower conductivity potting material potting the adjustment screw and output leads within the housing; and a radiation detector which provides a scaled output to the thermocouple leads.

10. A radiation detector and transmitter as claimed in claim 9 wherein the radiation detector comprises a thermocouple in series with a thermopile.

* * * * *